(12) United States Patent
Obu et al.

(10) Patent No.: US 9,528,006 B2
(45) Date of Patent: Dec. 27, 2016

(54) COATING COMPOSITION FOR UNDERCOATING

(75) Inventors: Yusuke Obu, Kanagawa (JP); Kashiko Kawai, Kanagawa (JP); Tomohiro Miyai, Kanagawa (JP); Shunya Nangou, Kanagawa (JP); Takahiro Hidaka, Kanagawa (JP); Hideki Masuda, Kanagawa (JP)

(73) Assignees: TOYO SEIKAN KAISYA, LTD., Tokyo (JP); KANSAI PAINT CO., LTD., Hyogo (JP)

( * ) Notice: Subject to any disclaimer, the term of this patent is extended or adjusted under 35 U.S.C. 154(b) by 514 days.

(21) Appl. No.: 13/513,905

(22) PCT Filed: Dec. 24, 2010

(86) PCT No.: PCT/JP2010/073454
§ 371 (c)(1),
(2), (4) Date: Jun. 5, 2012

(87) PCT Pub. No.: WO2011/078366
PCT Pub. Date: Jun. 30, 2011

(65) Prior Publication Data
US 2012/0238696 A1 Sep. 20, 2012

(30) Foreign Application Priority Data
Dec. 25, 2009 (JP) .................. 2009-294965

(51) Int. Cl.
C08G 18/08 (2006.01)
C08G 18/75 (2006.01)
C08G 18/79 (2006.01)
C08K 3/22 (2006.01)
C08K 3/26 (2006.01)
C09D 5/00 (2006.01)
C09D 7/12 (2006.01)
C09D 175/06 (2006.01)

(52) U.S. Cl.
CPC .......... *C09D 5/002* (2013.01); *C08G 18/0852* (2013.01); *C08G 18/755* (2013.01); *C08G 18/792* (2013.01); *C09D 7/1216* (2013.01); *C09D 7/1266* (2013.01); *C09D 7/1275* (2013.01); *C09D 175/06* (2013.01); *C08K 3/22* (2013.01); *C08K 3/26* (2013.01); *C08K 2201/008* (2013.01)

(58) Field of Classification Search
CPC ..... C09D 5/002; C09D 7/1216; C09D 7/1266; C09D 7/1275; C09D 175/06; C08G 18/755; C08G 18/792; C08G 18/0852; C08K 3/22; C08K 3/26; C08K 2201/008
USPC ................... 524/589, 590; 525/440.01
See application file for complete search history.

(56) References Cited

U.S. PATENT DOCUMENTS

| | | | |
|---|---|---|---|
| 7,476,712 B2 | 1/2009 | Tanaka et al. | |
| 2005/0131162 A1* | 6/2005 | Tanaka et al. | 525/329.7 |
| 2011/0091743 A1 | 4/2011 | Obu et al. | |
| 2011/0200836 A1 | 8/2011 | Obu et al. | |
| 2013/0273374 A1* | 10/2013 | Kawai et al. | 428/422.8 |

FOREIGN PATENT DOCUMENTS

| | | |
|---|---|---|
| EP | 0 464 750 | 1/1992 |
| EP | 1 614 532 | 1/2006 |
| JP | 2002-240207 | 8/2002 |
| JP | 2003-171419 | 6/2003 |
| JP | 2005-272757 | 10/2005 |
| JP | 2006-219518 | 8/2006 |
| JP | 2007-313758 | 12/2007 |
| WO | 03/091317 | 11/2003 |
| WO | 2009/041500 | 4/2009 |
| WO | 2010/001836 | 1/2010 |
| WO | 2011/040540 | 4/2011 |

OTHER PUBLICATIONS

Search report from International Patent Application No. PCT/JP2010/073454, mail date is Apr. 5, 2011.
Extended European Search Report (EESR) in European Patent Application No. 10839594.8, dated May 7, 2013.

* cited by examiner

*Primary Examiner* — Patrick Niland
(74) *Attorney, Agent, or Firm* — Greenblum & Bernstein, P.L.C.

(57) ABSTRACT

To provide a coating composition for undercoating which, in forming a gas-barrier layer having a crosslinked structure between a polycarboxylic acid type polymer and polyvalent metal ions by the heating at a low temperature for a short period of time, permits polyvalent metal ions to be easily and quickly fed into the polycarboxylic acid type polymer and, besides, into the whole gas-barrier layer. A coating composition containing, as chief components, a nonaqueous polyester polyol, an isocyanate compound, and an alkaline compound of a polyvalent metal that serves as an ion source for forming the crosslinked structure, wherein the nonaqueous polyester polyol contains a nonaqueous polyester polyol which contains a metal element in the resin skeleton thereof as an essential component, and the alkaline compound of the polyvalent metal has an average primary particle size in a range of 0.005 to 0.5 μm.

10 Claims, 1 Drawing Sheet

US 9,528,006 B2

COATING COMPOSITION FOR UNDERCOATING

TECHNICAL FIELD

This invention relates to a coating composition for forming gas-barrier layer that has a crosslinked structure of a polycarboxylic acid type polymer and polyvalent metal ions. More specifically, the invention relates to a coating composition for undercoating that is used prior to applying a polycarboxylic acid type polymer-containing solution.

BACKGROUND ART

A variety of gas-barrier materials have heretofore been proposed. In recent years, however, from the environmental standpoint and as a gas-barrier material that is not affected by the humidity conditions, there has been proposed a gas-barrier material obtained by ionically crosslinking a polycarboxylic acid type polymer with a polyvalent metal.

For example, the following patent document 1 provides a gas-barrier resin composition which is characterized by reacting a polycarboxylic acid type polymer with a crosslinking agent having 2 to 4 functional groups reacting with the carboxy groups and a divalent or more metal ion to form crosslinked part due to the crosslinking agent and crosslinked part due to the divalent or more metal ion on the polycarboxylic acid type polymer, and having a polycarboxylic acid type polymer/crosslinking agent weight ratio of 99.9/0.1 to 65/35. Further, the following patent document 2 is proposing a gas-barrier film obtained by forming a gas-barrier coating on at least one surface of a thermoplastic resin film, the coating being formed of a polyacrylic acid crosslinked with a crosslinking agent that contains an epoxy compound having three or more epoxy groups per a molecule thereof, and the crosslinking agent being contained in an amount of 1 to 100 parts by mass per 100 parts by mass of the polyacrylic acid.

The gas-barrier materials disclosed in the above patent documents 1 and 2 must be crosslinked to a high degree by being heated at a temperature of as high as 150° C. or more or for an extended period of time, seriously affecting the plastic base body. Further, the gas-barrier materials require a dip treatment or a spray treatment for being ionically crosslinked with metal ions arousing, therefore, such problems as poor productivity while consuming large amounts of energy and water. Besides, the above gas-barrier materials are not fully satisfactory, either, in regard to flexibility and retort resistance.

As a gas-barrier laminated film that can be dry-baked at a relatively low temperature, further, there has been proposed a gas-barrier laminated film comprising a layer (a) formed by using a coating solution (A) containing a polycarboxylic acid type polymer without heat treatment, and a layer (b) formed by using a coating solution (B) containing a water-soluble polyvalent metal salt and an aqueous resin, the layer (a) formed of the coating solution (A) and the layer (b) formed of the coating solution (B) forming at least a pair of lamination units neighboring each other (patent document 3).

PRIOR ART DOCUMENTS

Patent Documents

Patent document 1: JP-A-2003-171419
Patent document 2: JP-A-2002-240207
Patent document 3: JP-A-2007-313758

OUTLINE OF THE INVENTION

Problems that the Invention is to Solve

The gas-barrier laminated film disclosed in the above patent document 3 can be dry-baked at a relatively low temperature and does not affect the base material. With the above laminated film, however, at the time when the coating solution (B) containing the water-soluble polyvalent metal salt and the aqueous resin is applied, the polycarboxylic acid type polymer applied earlier has already been fixed. Therefore, the polyvalent metal salt does not fully migrate into the layer (a), and the ionic crosslinking with the polyvalent metal does not develop to a sufficient degree. As a treatment after the baking, therefore, a dip treatment or a spray treatment, which is a known method, must be conducted to enhance the ionic crosslinking ratio. Otherwise, the gas-barrier property is not still satisfactory. Satisfactory results are not obtained, either, in regard to productivity and cost.

It is, therefore, an object of the present invention to provide a coating composition for undercoating which, in forming a gas-barrier layer having a crosslinked structure between a polycarboxylic acid type polymer and polyvalent metal ions, permits polyvalent metal ions to be easily and quickly fed into the polycarboxylic acid type polymer and, besides, into the whole gas-barrier layer.

Another object of the invention is to provide a coating composition for undercoating which is capable of further improving interlayer adhesion relative to the gas-barrier layer or the plastic base material.

Means for Solvent the Problems

According to the present invention, there is provided a coating composition for undercoating applied as an undercoating onto the surface of a plastic base material for forming a gas-barrier layer that has a crosslinked structure of a polycarboxylic acid type polymer and polyvalent metal ions, the coating composition containing, as chief components, a nonaqueous polyester polyol, an isocyanate compound having at least two isocyanate groups in a molecule thereof, and an alkaline compound of a polyvalent metal that serves as an ion source for forming the crosslinked structure, wherein:

(a) the nonaqueous polyester polyol contains a nonaqueous polyester polyol which contains a metal element in the resin skeleton thereof; and (b) the alkaline compound of the polyvalent metal has an average primary particle size in a range of 0.005 to 0.5 μm.

In the coating composition for undercoating of the invention, it is desired that:

1. The metal element contained in the resin skeleton is a monovalent metal element;
2. The nonaqueous polyester polyol contains, in an amount of at least 10% by mass, a nonaqueous polyester polyol that contains a metal element in the resin skeleton thereof;
3. The nonaqueous polyester polyol comprises two or more kinds of nonaqueous polyester polyols inclusive of a nonaqueous polyester polyol of a low Tg having a glass transition temperature (Tg) of not lower than −30° C. but lower than 30° C. and a nonaqueous polyester polyol of a high Tg having a glass transition temperature (Tg) of 30 to 90° C.;
4. The nonaqueous polyester polyol contains the nonaqueous polyester polyol of the high Tg having the glass transition temperature (Tg) of 30 to 90° C. in an amount of at least 10% by mass;

5. The isocyanate compound is a polyfunctional polyisocyanate compound having a number average molecular weight of not less than 200 and not less than 3 isocyanate groups in a molecule thereof;
6. If the weight of a curing agent necessary for the reaction by the amount of a hydroxyl value of the nonaqueous polyester polyol is presumed to be one equivalent, the isocyanate compound is contained in an amount of at least 2 equivalents;
7. The alkaline compound of the polyvalent metal comprises at least one of a carbonate or a hydroxide of calcium or magnesium;
8. The alkaline compound of the polyvalent metal is contained in an amount of 150 to 400 parts by mass per a total of 100 parts by mass the nonaqueous polyester polyol and the isocyanate compound;
9. The isocyanate compound comprises a combination of a straight-chain aliphatic isocyanate compound and an alicyclic isocyanate compound having an alicyclic structure in the skeleton thereof;
10. The ratio of the straight-chain aliphatic isocyanate compound and the alicyclic isocyanate compound is 60:40 to 15:85 (weight ratio);
11. The straight-chain aliphatic isocyanate compound has an isocyanurate structure; and
12. The straight-chain aliphatic isocyanate compound has a glass transition temperature (Tg) of not higher than −20° C. and a number average molecular weight (Mn) of not more than 1200, and the alicyclic isocyanate compound has a glass transition temperature (Tg) of not lower than 50° C. and a number average molecular weight (Mn) of not less than 400.

Effects of the Invention

Upon being applied onto the surface of a plastic base member as an undercoating prior to applying the polycarboxylic acid type polymer, the coating composition of the present invention enables polyvalent metal ions to be easily and quickly fed before the polycarboxylic acid type polymer is fixed, making it possible to form a gas-barrier layer having a sufficient degree of cross linked structure between the polycarboxylic acid type polymer and the polyvalent metal ions, achieving a high ionically crosslinked ratio without the need of conducting the dip treatment or the spray treatment, and imparting excellent gas-barrier property to the gas-barrier layer.

By using the coating composition for undercoating of the invention, further, the crosslinked structure is easily formed only by the heating at a low temperature for a short period of time without adversely affecting the plastic base body on which the gas-barrier layer is formed, shortening the production time, requiring reduced amount of energy, and making it possible to form an excellent gas-barrier material (gas-barrier laminate) maintaining good productivity.

Further, when the nonaqueous polyester polyol that is used comprises two or more kinds of nonaqueous polyester polyols inclusive of a nonaqueous polyester polyol of a low Tg having a glass transition temperature (Tg) of not lower than −30° C. but lower than 30° C. and a nonaqueous polyester polyol of a high Tg having a glass transition temperature (Tg) of 30 to 90° C., the cohesive force can be secured in the undercoating while efficiently feeding polyvalent metal ions into the polycarboxylic acid type polymer, effectively preventing the occurrence of cracks that stems from the internal stress that generates accompanying the formation of ionic crosslinking. Further, in this case, fluidity of the resin is maintained enabling the voids from which the alkaline compound particles have eluted out to be filled with the resin even after the film has been formed. The voids in the undercoating that form when the alkaline compound particles have eluted out can be filled even when the alkaline compound particles remaining in the undercoating are eluted out and work to form ionic crosslinking among the unreacted free carboxyl groups that are remaining in the polycarboxylic acid type polymer layer at the time of retort sterilization.

Further, when the isocyanate compound that is used is a combination of a straight-chain aliphatic isocyanate compound and an alicyclic isocyanate compound having an alicyclic structure in the skeleton thereof, of which the compatibilities are different to the nonaqueous polyester polyol which is a chief resin, the interlayer adhesion of the undercoating can be improved relative to the gas-barrier layer and the plastic base material, contributing to further improving the flexibility of the gas-barrier laminate that uses the coating composition for undercoating of the present invention.

Figure 1:
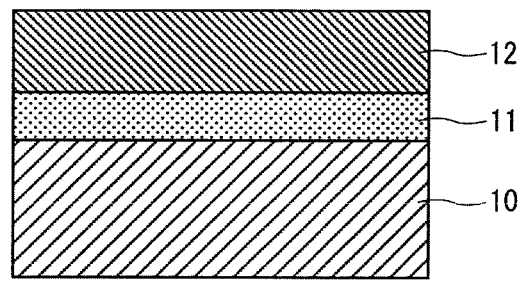
FIG. 1 is a view showing, in cross section, one example of a structure of a gas-barrier laminate formed by using a coating composition for undercoating of the present invention.

MODES FOR CARRYING OUT THE INVENTION (Coating Composition)

The coating composition for undercoating of the invention contains, as chief components, a nonaqueous polyester polyol, an isocyanate compound, and an alkaline compound of a polyvalent metal that serves as an ion source for forming the crosslinked structure, wherein an important feature resides in that:

(a) the nonaqueous polyester polyol contains a nonaqueous polyester polyol which contains a metal element in the resin skeleton thereof as an essential component; and
(b) the alkaline compound of the polyvalent metal has an average primary particle size in a range of 0.005 to 0.5 μm.

Upon being applied and dried on at least one surface of the plastic base material, the coating composition of the invention forms an undercoating in which an alkaline compound of a polyvalent metal is dispersed in a resin having an urethane bond formed of a polyester polyol and an isocyanate compound. Upon applying a solution containing at least water and a polycarboxylic acid type polymer onto the undercoating which comprises the coating composition of the invention, and, next, removing solvent by the heat treatment, the polyvalent metal ions migrate from the undercoating comprising the coating composition of the invention into the solution that contains the polycarboxylic acid type polymer and work to form metal ionic crosslinking among the carboxyl groups of the polycarboxylic acid type polymer enabling a gas-barrier layer to be formed.

Namely, the nonaqueous polyester polyol and the isocyanate compound in the coating composition of the invention by themselves work as anchor coatings enabling the gas-barrier layer formed of the polycarboxylic acid type polymer-containing solution to be closely adhered and laminated on the plastic base material. Besides, the nonaqueous polyester polyol that contains a metal element in the resin skeleton easily swells in the water-containing solvent. That is, the nonaqueous polyester polyol swells as the polycarboxylic acid type polymer-containing solution is applied onto the layer of the coating composition of the invention enabling the polyvalent metal ions to be effectively migrated into the polycarboxylic acid type polymer-containing solution.

Here, if the metal element is contained in the resin skeleton of the nonaqueous resin can be detected by the X-ray fluorometry of the starting resin. In Examples appearing later, a fluorescent X-ray spectroscope (ZSX100e manufactured by Rigaku Denki Co.) was used.

It has been known that a value obtained by the fluorescent X-ray spectroscope is, generally, dependent upon the measuring diameter, X-ray output, measuring time and sample thickness. Therefore, these conditions were fixed to measuring object of the Na—Kα-ray, measuring diameter of 30 mm, X-ray output of 50 kV-70 mA, measuring time of 40 s, and sample thickness of not more than 1 mm to establish a method of evaluation depending upon the materials. The samples to be measured can be prepared by working the resin by using a hot press or by coating by using a bar coater. From the measurement under these conditions, the samples exhibiting peaks based on the Na—Kα-ray were determined to be the resins containing a metal element in the nonaqueous resin skeleton.

The above actions and effects of the invention will become obvious from the results of Examples appearing later, too.

Namely, when the coating composition for undercoating does not contain the nonaqueous polyester polyol that contains a metal element, the ionic crosslinking factor becomes not lower than 30% provided the coating composition is applied at a conventional rate, i.e., provided the film is formed spending an extended period of time, and excellent gas-barrier property is exhibited before and after the retort treatment. If the film is prepared under the conditions of a shortened period of time by increasing the rate of application, however, the ionic crosslinking ratio stays lower than 20%, and satisfactory barrier property is not obtained before and after the retort treatment (Comparative Example 1). Further, when the coating composition, in which an alkaline compound of a polyvalent metal is dispersed in the nonaqueous polyester polyol that contains a monovalent metal element but that does not contain the monovalent metal element in the resin skeleton, forms a layer, the monovalent metal itself migrates into the polycarboxylic acid type polymer-solution. Therefore, the ionic crosslinking due to the polyvalent metal rather decreases, and satisfactory gas-barrier property is not obtained (Comparative Example 2).

When the coating composition of the present invention is used, on the other hand, even a film formed in a shortened period of time develops the ionic crosslinking ratio of 40% at the lowest. A film formed under the conventional conditions develops the ionic crosslinking ratio of not less than 70%. It is, therefore, obvious that the alkaline compound of a polyvalent metal migrates from the undercoating of the coating composition of the invention into the polycarboxylic acid type polymer-containing solution, and quickly dissolves therein to release polyvalent metal ions; i.e., the polyvalent metal ions are dispersed in the whole layer formed of the polycarboxylic acid type polymer-containing solution.

[Nonaqueous Polyester Polyols]

In the invention, the nonaqueous polyester polyol may be a polyester polyol obtained by reacting a polyvalent carboxylic acid or a dialkyl ester thereof or a mixture thereof with glycols or a mixture thereof.

As the polyvalent carboxylic acid, there can be exemplified aromatic polyvalent carboxylic acids such as isophthalic acid, terephthalic acid, and naphthalenedicarboxylic acid; and aliphatic polyvalent carboxylic acids such as adipic acid, azelaic acid, sebacic acid and cyclohexanedicarboxylic acid.

As the glycol, there can be exemplified ethylene glycol, propylene glycol, diethylene glycol, butylene glycol, neopentyl glycol and 1,6-hexane diol.

Further, the nonaqueous polyester polyol used in the present invention contains, as an essential component, a nonaqueous polyester polyol that contains a metal element in the resin skeleton. To obtain the above nonaqueous polyester polyol, a functional group containing metal salt is introduced into a monomer that constitutes the polyester polyol to thereby introduce a metal element into the resin skeleton of the polyester polyol.

In order to improve the dispersion property of the polyvalent metal, it is desired to introduce a base metal having a polar functional group into the monomer of the polyester polyol, i.e., into the polyvalent carboxylic acid component and into the glycols. Examples thereof include functional group containing metal salt of sulfonic acid and functional group containing metal salt of phosphoric acid. As the metal element, there can be exemplified lithium Li, potassium K, sodium Na, magnesium Mg, calcium Ca, copper Cu and iron Fe. Among them, a monovalent metal element is particularly preferred. In the invention, specifically, it is desired that sodium sulfonate is introduced.

As the polyvalent carboxylic acid into which the metal salt is introduced, there can be exemplified such metal salts as sulfoterephthalic acid, 5-sulfoisophthalic acid, 4-sulfonaphthalene-2,7-dicarboxylic acid, and 5[4-sulfophenoxy] isophthalic acid. As the polyol into which the functional group containing metal salt is introduced, further, there can be exemplified such metal salts as 2-sulfo-1,4-butane diol and 2,5-dimethyl-3-sulfo-2,5-hexane diol. Specifically preferred is the 5-sodium sulfoisophthalate.

It is desired that the monomer into which a functional group containing metal salt is introduced is copolymerized in an amount of 0.01 to 10% by mole.

In the invention, the content of the nonaqueous polyester polyol which contains the metal element in the resin skeleton is at least 10% by mass and, specifically, 30 to 100% by mass per the whole nonaqueous polyester polyol. If the amount of the nonaqueous polyester polyol that contains the metal element in the resin skeleton is small, the polyvalent metal ions cannot be easily and sufficiently fed into the polycarboxylic acid type polymer.

The glass transition temperature of the polyester polyol is, preferably, in a range of −50° C. to 100° C. and, more preferably, in a range of −30° C. to 90° C. Further, the number average molecular weight of the polyester polyol is in a range of 1000 to 100,000 and, specifically, 3000 to 80,000.

It is, further, desired that the nonaqueous polyester polyol has a hydroxyl value (mgKOH/g) of 2 to 25. If the hydroxyl value is smaller than the above range, the crosslinking reaction with the isocyanate compound is insufficient and the anchoring effect may not be sufficiently exhibited. If the hydroxyl value is larger than the above range, on the other hand, the crosslinking reaction with the isocyanate compound may become excessive.

In the invention, specifically, it is desired that the nonaqueous polyester polyol comprises two or more kinds of nonaqueous polyester polyols inclusive of a nonaqueous polyester polyol of a low Tg having a glass transition temperature (Tg) of not lower than −30° C. but lower than 30° C. and, specifically, −20 to 20° C. and a nonaqueous polyester polyol of a high Tg having a glass transition temperature (Tg) of 30 to 90° C. and, specifically, 50 to 70° C.

Namely, upon applying the polycarboxylic acid type polymer-containing solution in a state where the coating composition for undercoating of the invention has been applied on the plastic base material and has been dried, the polyvalent metal ions are efficiently fed into the polycarboxylic acid type polymer to form the ionic crosslinking. Here, however, internal stress generates in the gas-barrier layer as the ionic crosslinking is formed. Specifically, in elevating the drying temperature and the air-blowing rate for continuously executing the treatment at a high rate, if the cohesive force of the undercoating is weak, then cracks may occur in the undercoating and in the gas-barrier layer. However, the nonaqueous polyester polyol of a high Tg that is contained maintains the cohesive force of the undercoating to effectively prevent the occurrence of cracks caused by the internal stress that generates accompanying the formation of the ionic crosslinking.

On the other hand, the nonaqueous polyester polyol of a low Tg that is contained works to maintain fluidity of the resin making it possible to effectively fill the voids from where alkaline compound particles of a polyvalent metal have eluted out under the hot water sterilizing conditions such as of retort sterilization.

When the nonaqueous polyester polyol contains two or more kinds of nonaqueous polyester polyols inclusive of a nonaqueous polyester polyol of a high Tg and a nonaqueous polyester polyol of a low Tg, it is desired that the nonaqueous polyester polyol of the high Tg is contained in an amount of at least 10% by mass and, specifically, in a range of 20 to 80% by mass in the whole nonaqueous polyester polyols and, further, that the nonaqueous polyester polyol of the low Tg is contained in an amount in a range of 10 to 90% by mass and, specifically, 20 to 80% by mass from the standpoint of exhibiting the above-mentioned effects maintaining good balance.

[Isocyanate Compounds]

The coating composition of the present invention uses an isocyanate compound as a curing agent for the nonaqueous polyester polyol which is a chief material to thereby form an urethane bond in the undercoating realizing excellent adhesion to the base material and enhancing dispersion of the alkaline compound of the polyvalent metal.

As the isocyanate compound contained in the coating material, there can be exemplified aromatic polyisocyanates such as 2,4-tolylenediisocyanate, 2,6-tolylenediisocyanate, m-phenylenediisocyanate, p-phenylenediisocyanate, 4,4'-diphenylmethanediisocyanate, 2,4'-diphenylmethanediisocyanate, 2,2'-diphenylmethanediisocyanate, 3,3'-dimethyl-4,4'-biphenylenediisocyanate, 3,3'-dimethoxy-4,4'-biphenylenediisocyanate, 3,3'-dichloro-4,4'-biphenylenediisocyanate, 1,5-naphthalenediisocyanate, 1,5-tetrahydronaphthalenediisocyanate, xylylenediisocyanate and tetramethylxylylenediisocyanate; aliphatic polyisocyanates such as tetramethylenediisocyanate, 1,6-hexamethylenediisocyanate, dodecamethylenediisocyanate, trimethylhexamethylenediisocyanate, 1,3-cyclohexylenediisocyanate, 4-cyclohexylenediisocyanate, hydrogenated xylylenediisocyanate, lizinediisocyanate, isophorondiisocyanate, 4,4'-dicyclohexylmethanediisocyanate, and 3,3'-dimethyl-4,4'-dicyclohexylmethanediisocyanate; polyfunctional polyisocyanate compounds such as isocyanurate, biuret and allophatate derived from the above polyisocyanate monomer; and terminal isocyanate group-containing polyfunctional polyisocyanate compounds obtained by the reaction with three-functional or more highly functional polyol compound such as trimethylolpropane or glycerin.

In the invention, it is desired that the isocyanate compound has a number average molecular weight of not less than 200 and, specifically, in a range of 500 to 3500, and is a polyfunctional polyisocyanate compound having not less than three isocyanate groups in a molecule thereof and, specifically, an isocyanurate derived from an aliphatic polyisocyanate monomer.

In the coating composition of the invention, if the weight of a curing agent necessary for the reaction by the amount of a hydroxyl value of the nonaqueous polyester polyol is presumed to be one equivalent, then the isocyanate compound is desirably contained in an amount of at least 2 equivalents and, specifically, in a range of 5 to 40 equivalents. The isocyanate compound works not only as a crosslinking component for the nonaqueous polyester polyol but also works as a reaction component in the interface relative to the base material or the gas-barrier layer. In order for the above action and effect to be fully exhibited, it is desired that the isocyanate compound is contained in an excess amount. Even if contained in an amount larger than the above range, however, no further effect is expected posing disadvantage in economy.

As the isocyanate compound, further, the invention uses in combination a straight-chain aliphatic isocyanate compound and an alicyclic isocyanate compound having an alicyclic structure in the skeleton thereof, of which the compatibilities are different to the nonaqueous polyester polyol which is a chief resin, making it possible to control such a behavior as bleed-out (surface layer migration) of the isocyanate compound in the undercoating and to form a region free of the alkaline compound of the polyvalent metal but containing nitrogen much more than the other portions (central portion) of the undercoating on the side of the barrier layer or on the side of the barrier layer and on the side of the base material on which the coating composition for undercoating is applied.

Namely, the straight-chain aliphatic isocyanate compound is highly compatible to the main resin material and is homogeneously dispersed in the undercoating. On the other hand, the alicyclic isocyanate compound having an alicyclic structure in the skeleton thereof is poorly compatible to the main resin material and, therefore, bleeds out on the side of the barrier layer and on the side of the base material in the undercoating, and becomes dense especially on the side of the barrier layer. Therefore, the nitrogen content in the above region becomes larger than the nitrogen content of the undercoating other than the above region.

The undercoating having the above region enables the interlayer adhesion to be very improved between the undercoating and the barrier layer, and between the undercoating and the base material.

When the straight-chain aliphatic isocyanate compound and the alicyclic isocyanate compound having the alicyclic structure in the skeleton thereof are used in combination as the isocyanate compound, it is desired that the straight-chain aliphatic isocyanate compound and the alicyclic isocyanate compound are blended at a weight ratio of 60:40 to 15:85 and, specifically, 55:45 to 30:70. If the amount of the straight-chain aliphatic isocyanate compound is smaller than the above range, sufficiently large adhesion is not obtained. If the amount of the alicyclic isocyanate compound is smaller than the above range, on the other hand, it may become difficult to form the above-mentioned region.

As the straight-chain aliphatic isocyanate, though not limited thereto only, there can be exemplified tetramethylenediisocyanate, 1,6-hexamethylenediisocyanate, dodecamethylenediisocyanate and trimethylhexamethylenediisocyanate. Among them, it is desired that the straight-chain aliphatic isocyanate has an isocyanurate structure. Concretely, there can be preferably used an isocyanurate derivative of the 1,6-hexamethylenediisocyanate.

As the alicyclic isocyanate compound having the alicyclic structure in the skeleton thereof, further, though not limited thereto only, there can be exemplified 1,3-cyclohexylenediisocyanate, 4-cyclohexylenediisocyanate, hydrogenated xylylenediisocyanate, lizinediisocyanate, isophoronediisocyanate, 4,4'-dicyclohexylmethanediisocyanate and 3,3'-dimethyl-4,4'-dicyclohexylmethanediisocyanate. Among them, isophoronediisocyanate can be preferably used.

As the straight-chain aliphatic polyisocyanate compound and alicyclic isocyanate compound, there can be also used a polyfunctional polyisocyanate compound such as isocyanurate, biuret or allophanate derived from the polyisocyanate monomer, and a terminal isocyanate group-containing polyfunctional polyisocyanate compound obtained by the reaction with a three-functional or more highly functional polyol compound, such as trimethylolpropane or glycerin.

In the invention, it is desired that the straight-chain aliphatic isocyanate compound has a glass transition temperature (Tg) of not higher than −20° C. and a number average molecular weight (Mn) of not more than 1200 and, specifically, Tg in a range of −40 to −100° C. and Mn in a range of 160 to 1100 from such a standpoint that it easily and homogeneously disperses in the undercoating as the solvent volatilizes. It is, further, desired that the alicyclic isocyanate compound has a glass transition temperature (Tg) of not lower than 50° C. and a number average molecular weight (Mn) of not less than 400 and, specifically, Tg in a range of 60 to 120° C. and Mn in a range of 500 to 5000 from such a standpoint that it stays in the undercoating on the side of the barrier layer or on the side of the plastic base material to easily form a region which is free of the alkaline compound of the polyvalent metal and has a nitrogen content larger than that of other portions (central portion) of the undercoating.

[Alkaline Compounds of Polyvalent Metals]

It is important that the alkaline compound of the polyvalent metal used for the coating composition of the invention has an average primary particle size in a range of 0.005 to 0.5 μm. This effectively prevents coarse particles of the alkaline compound of the polyvalent metal from remaining in the undercoating that is formed even under high-speed treating conditions, and imparts excellent transparency. The average primary particle size of the alkaline compound particles of the polyvalent metal can be found from the secondary electron image thereof by using a scanning-type electron microscope.

It is, further, desired that the surfaces of particles of the alkaline compound of the polyvalent metal have not been chemically treated from such a standpoint that the alkaline compound of the polyvalent metal that has migrated into the polycarboxylic acid type polymer quickly dissolves therein.

As the polyvalent metal ions, there is no specific limitation so far as they are capable of crosslinking the carboxyl groups of the polycarboxylic acid type polymer, and there can be exemplified metal ions such as of alkaline earth metals (magnesium Mg, calcium Ca, strontium Sr, barium Ba, etc.), metals of the group 8 of periodic table (iron Fe, ruthenium Ru, etc.), metals of the Group 11 of periodic table (copper Cu, etc.), metals of the Group 12 of periodic table (zinc Zn, etc.) and metals of the Group 13 of periodic table (aluminum Al, etc.). Specifically, it is desired to use divalent to trivalent metal ions and, preferably, divalent metal ions such as of calcium, magnesium, zinc or the like. The metal ions can be used in one kind or in a combination of two or more kinds.

As the alkaline compound of the polyvalent metal, there can be exemplified hydroxides of the above metals (e.g., magnesium hydroxide, calcium hydroxide, etc.); carbonates of the above metals (e.g., magnesium carbonate, calcium carbonate, etc.); and organic acid salts of the above metals such as carboxylates (e.g., acetates like zinc acetate or calcium acetate, or lactates like zinc lactate or calcium lactate). From the standpoint of safety of when used as a material for packing foods and preventing a byproduct from staying in the layer (B) at the time when the metal ionic crosslinking is formed, however, it is particularly desired to use at least one of a carbonate or a hydroxide of calcium or magnesium.

When so calculated that two carboxyl groups react with one polyvalent metal ion in the coating composition of the invention, it is desired that the alkaline compound of the polyvalent metal is contained in an amount of not less than 0.4 equivalents per the carboxyl groups of the polycarboxylic acid type polymer present in the polycarboxylic acid type polymer-containing solution that will be described later, and specifically when used for the retort sterilization, is contained in an amount of not less than 0.6 equivalents, from the standpoint of maintaining gas-barrier property after the retort sterilization. If the content of the alkaline compound of the polyvalent metal is smaller than the above range, the polycarboxylic acid type polymer cannot be sufficiently crosslinked and it becomes difficult to maintain gas-barrier property.

[Preparation of the Coating Composition]

According to the present invention, it is desired to so prepare the coating composition as to contain the nonaqueous polyester polyol in an amount of 10 to 100% by mass and, specifically, 30 to 100% by mass as the resin component in the coating material, and to contain the isocyanate compound in an amount of, as described above, at least 2 equivalents and, specifically, in a range of 5 to 40 equivalents depending upon the hydroxyl value of the nonaqueous polyester polyol that is used.

It is, further, desired that the alkaline compound of the polyvalent metal is contained in an amount of 150 to 400 parts by mass and, specifically, 160 to 300 parts by mass per a total of 100 parts by mass of the nonaqueous polyester polyol and the isocyanate compound.

Since the resin component is nonaqueous, it is desired to prepare the coating composition by using a solvent such as toluene, 2-butanone, cyclohexanone, Solvesso, isophorone, xylene, ethyl acetate or butyl acetate and, specifically, by using a low-boiling solvent so that the coating can be formed at a low temperature. These solvents may be used alone or mixed solvents, or the solutions of the components may be mixed together.

In addition to the above components, it is allowable to further use a catalyst for accelerating the curing, filler, softening agent, anti-aging agent, stabilizer, adhesion promoter, leveling agent, defoaming agent, plasticizer, inorganic filler, stickiness-imparting resin, fibers, coloring agent such as pigment, usable time-extending agent and the like that have been known per se.

(Preparation of the Gas-Barrier Material (Gas-Barrier Laminate))

To form a gas-barrier material (gas-barrier laminate) having a gas-barrier layer comprising the polycarboxylic acid type polymer on the plastic base material by using the coating composition of the invention, the coating composition of the invention is applied and dried on at least one surface of the plastic base material and, next, the polycarboxylic acid type polymer-containing solution is applied thereon and is heated. FIG. 1 is a view showing, in cross section, a structure of the gas-barrier laminate formed by using the coating composition of the present invention. On one surface of the plastic base material 10, there are formed an undercoating 11 comprising the coating composition of the invention, and a gas-barrier layer 12 thereon.

The amount of applying the coating composition of the invention is determined by the amounts of the nonaqueous polyester polyol, the isocyanate compound and the alkaline compound of the polyvalent metal in the coating composition, and cannot be definitely specified, but is desirably such that the amount of the nonaqueous polyeter polyol is in a range of 0.02 to 5.0 g/m$^2$ and, specifically, 0.1 to 2.0 g/m$^2$ in the undercoating that is formed and that, as described above, the amount of the polyvalent metal ions is not less than 0.4 equivalents relative to the carboxyl groups of the polycarboxylic acid type polymer in the polycarboxylic acid type polymer-containing solution that is applied. If the amount of the nonaqueous polyester polyol is smaller than the above range, it becomes difficult to stick the undercoating to the plastic base material. If the amount of the resin component is larger than the above range, there is obtained no particular advantage but disadvantage in economy.

Further, though dependent upon the composition of the coating material and the amount of application, the coating composition of the invention applied onto the plastic base material is dried at a temperature of 50 to 200° C. for 0.5 seconds to 5 minutes and, specifically, at a temperature of 70 to 140° C. for 1 second to 2 minutes in order to economically form the undercoating without affecting the plastic base material.

Next, the polycarboxylic acid type polymer-containing solution is applied onto the undercoating that is formed. The amount of the polycarboxylic acid type polymer contained in the resin composition in the polycarboxylic acid type-polymer-containing solution, i.e., the amount of the free carboxyl groups, is at least not less than 150 KOHmg/g and, specifically, in a range of 250 to 970 KOHmg/g in terms of the acid value. Here, the acid value stands for the amount of the potassium hydroxide in milligrams needed for neutralizing the acidic free functional groups contained in a gram of the resin as found by an ordinary method based on the alkali neutralization titration.

The polycarboxylic acid type polymer-containing solution is applied, desirably, in an amount in a range of 0.3 to 4.5 g/m$^2$ and, specifically, 0.5 to 3.0 g/m$^2$ in a dry state of only the resin component before the ionic crosslinking is formed in the gas-barrier layer. If the amount of application is smaller than the above range, the barrier property is not obtained to a sufficient degree. Even if the amount of the resin component is larger than the above range, there is obtained no particular advantage but disadvantage in economy.

Next, the polycarboxylic acid type polymer-containing solution that is applied is heat-treated. Here, during the heat treatment, the polyvalent metal ions in the undercoating migrate into the polycarboxylic acid type polymer-containing solution to form a crosslinked structure among the carboxyl groups of the polycarboxylic acid type polymer. Further, if a crosslinking agent is contained in the polycarboxylic acid type polymer-containing solution, a crosslinked structure is, at the same time, formed among the carboxyl groups of the polycarboxylic acid type polymer due to the covalent bond by the crosslinking agent.

The polycarboxylic acid type polymer-containing solution is heated, desirably, under the conditions of a temperature of 30 to 140° C. and, specifically, 40 to 120° C. for 0.1 second to 1 minute.

The coating composition of the invention and the polycarboxylic acid type polymer-containing solution are applied and dried or heat-treated according to a conventional method.

The coating method is, for example, spray coating, dipping or by using a bar coater, roll coater or gravure coater though not limited thereto only.

The drying or the heat treatment is done by, for example, drying in an oven (heating), infrared-ray heating or high-frequency heating.

[Polycarboxylic Acid Type Polymer-Containing Solution]

The polycarboxylic acid type polymer-containing solution applied onto the undercoating formed by using the coating composition of the invention is, desirably, a solution in which the polycarboxylic acid type polymer is dissociated by dissolving the polycarboxylic acid type polymer in a solvent which contains at least water.

As the polycarboxylic acid type polymer contained in the polycarboxylic acid type polymer-containing solution, there can be exemplified a homopolymer or a copolymer of a monomer having a carboxyl group, such as polyacrylic acid, polymethacrylic acid, polymaleic acid, polyitaconic acid or acrylic acid/methacrylic acid copolymer. Specifically, polyacrylic acid and polymethacrylic acid are desired. Or there can be used a partly neutralized product thereof to promote the dissociated state of the polycarboxylic acid type polymer in the solution.

The polycarboxylic acid type polymer can be partly neutralized with a metal hydroxide such as sodium hydroxide or potassium hydroxide or with ammonia.

Though not specifically limited, the degree of neutralization of the partly neutralized product is, desirably, not more than 60% and, specifically, not more than 40% as a mole ratio to the carboxyl groups. If larger than the above range, the ionic crosslinking due to the alkaline compound of the polyvalent metal is not obtained to a sufficient degree.

Though not specifically limited, the "weight average molecular weight" of the polycarboxylic acid type polymer is in a range of, desirably, 2000 to 5,000,000 and, particularly, 10,000 to 1,000,000.

The solvent used for the polycarboxylic acid type polymer-containing solution may be water alone, but may be a mixed solvent of water and an alcohol such as methanol, ethanol or isopropanol, a ketone such as 2-butanone or acetone, or an aromatic solvent such as toluene. Specifically, a solvent having a boiling point lower than that of water can be used in combination with water.

Desirably, a solvent having good affinity to the undercoating of the coating composition of the invention works to improve affinity to the undercoating and to promote the migration of the alkaline compound of the polyvalent metal into the polycarboxylic acid type polymer-containing solution. As the solvent having good affinity to the undercoating of the coating composition of the invention, there can be desirably used an alcohol such as methanol, ethanol or isopropanol, and a ketone such as 2-butanone or acetone.

When a mixed solvent of water and other solvent is used as the solvent, it is desired that the other solvent is added in an amount of not more than 1900 parts by mass and, specifically in an amount of 10 to 900 parts by mass per 100 parts by mass of water.

The polycarboxylic acid type polymer-containing solution may be blended with a crosslinking agent capable of reacting with unreacted carboxyl groups of the polycarboxylic acid type polymer to form a crosslinked structure by the covalent bond. Namely, multivalent metal ions migrated from the undercoating of the coating composition of the invention undergo ionic crosslinking with the carboxyl groups of the polycarboxylic acid type polymer to form the crosslinked structure. Here, the carboxyl groups that were not used for the crosslinking are crosslinked with the crosslinking agent to form the crosslinked structure by the covalent bond at the crosslinking portion in order to improve resistance against hot water of the gas-barrier layer that is formed.

A specifically preferred crosslinking agent may be a compound having two ring structures forming an ether bond to a carbon atom that forms a double bond to a nitrogen atom, the ring structures including an oxygen atom in the ether bond, i.e., having two ring structures with an oxoimino group having a group —N=C—O— or a part =C—O— in the ring, or may be an alicyclic epoxy compound containing an epoxy compound component that has an alicyclic group in the molecule thereof and in which neighboring carbon atoms of the alicyclic group are forming an oxirane ring. By using the above crosslinking agent, at least two ester bonds or amidoester bonds can be formed in the crosslinked part. These crosslinking agents can be used alone or in combination.

It is desired that the polycarboxylic acid type polymer-containing solution contains the polycarboxylic acid type polymer in an amount of 2 to 60% by mass and, specifically, 4 to 40% by mass to obtain more excellent gas-barrier property.

Further, the polycarboxylic acid type polymer-containing solution contains, as required, the crosslinking agent in an amount of, desirably, 0.1 to 20 parts by mass per 100 parts by mass of the polycarboxylic acid type polymer. If the amount thereof is smaller than the above range, the resistance against hot water is not so much improved. If the amount thereof is larger than the above range, on the other hand, it becomes disadvantageous in economy and, besides, the polyvalent metal ions fail to form the crosslinked structure with the carboxyl groups to a sufficient degree, and the gas-barrier property is not improved.

The nonaqueous polyester polyol that contains the metal element in the resin skeleton in the coating composition of the invention swells well in water permitting the polyvalent metal ions to effectively migrate into the polycarboxylic acid type polymer-containing solution. It is, therefore, desired to prepare the solution of the polycarboxylic acid type polymer by using a solvent which contains at least water. The above crosslinking agent may be directly added to the above solvent composition if it is soluble therein. Or, after the polycarboxylic acid type polymer has been added to the solution, the crosslinking agent is separately dissolved in a solvent or a mixed solvent which is capable of dissolving the crosslinking agent and of maintaining the state of the solution, and this solution is added to the polycarboxylic acid type polymer-containing solution.

Further, the acidic or basic catalyst may be added to accelerate the reaction of the carboxyl groups of the polycarboxylic acid type polymer with the crosslinking agent.

The polycarboxylic acid type polymer-containing solution may further contain an inorganic dispersion in addition to the above components. The inorganic dispersion works to block the water entering from the exterior, to protect the gas-barrier material and to further improve the gas-barrier property and waterproof property.

[Plastic Base Material]

Upon being applied and heated on the surface of the plastic base material, the coating composition of the invention forms the undercoating. Next, upon being applied and heated thereon, the polycarboxylic acid type polymer-containing solution forms the gas-barrier layer thereon. Thus, the gas-barrier material (gas-barrier laminate) is formed.

As the plastic base material on which the coating composition of the invention is to be applied, though not limited thereto only, there can be exemplified film, sheet or any package such as bottle, cup, tray or can that are produced from a heat-formable thermoplastic resin through such means as extrusion molding, injection molding, blow molding, stretch-blow molding or press molding.

Further, the plastic base material may be a molded article such as the final film, sheet or container, or may be a preform which will be molded into a container and on which the coating is formed in advance. As the preform, there can be exemplified a cylindrical parison with or without bottom that is to be biaxially stretch-blow-molded, a pipe from which a plastic can will be molded, a sheet for vacuum molding, compressed-air molding or plug-assisted molding or a film for a heat-sealable lid or for making pouches.

EXAMPLES

The invention will be further described by way of the following Examples to which only, however, the invention is in no way limited.

Example 1

A hundred percent by mass of a nonaqueous polyester polyol (Vylon GK570, Mn=17,000, hydroxyl value=7, Tg=0° C., manufactured by Toyobo Co., Ltd.) dissolved in an ethyl acetate/MEK mixed solvent (weight ratio of 65/35) and containing a metal element in the resin skeleton was blended with 250% by mass of calcium carbonate (Brilliant 1500, average primary particle size of 0.15 µm, manufactured by SHIRAISHI CALCIUM KAISHA, LTD.) so that the total solid component was 35% by mass. Thereafter, the mixture thereof was milled and dispersed by using glass beads (BZ-04 manufactured by Toshinriko Co.) to obtain a paste thereof. To the paste was added a polyisocyanate (Sumidur N3300, isocyanurate based on 1.6-hexamethylenediisocyanate, Tg=−60° C., Mn=680, manufactured by Sumika Bayer Urethane Co., Ltd.) so that the amount of polyisocyanate was 10 equivalents to the hydroxyl value of the nonaqueous polyester polyol, and to which the above mixed solvent was so added that the total solid component was 30% by mass to thereby obtain a coating solution (a') for undercoating comprising the coating composition (a) for undercoating that contains an alkaline compound of a polyvalent metal.

Examples 2 to 10

Coating solutions (a') for undercoating were obtained in the same manner as in Example 1 but changing the coating composition (a) for undercoating containing the alkaline compound of the polyvalent metal in the coating solution (a') for undercoating into the compositions of Examples 2 to 10 shown in Table 1.

Comparative Example 1

A coating solution (a') for undercoating was obtained in the same manner as in Example 1 but using a nonaqueous polyester polyol (Vylon 200, Mn=17,000, hydroxyl value=6, Tg=67° C., manufactured by Toyobo Co., Ltd.) without containing metal element instead of using the nonaqueous polyester polyol (Vylon GK570, Mn=17,000, hydroxyl value=7, Tg=0° C., manufactured by Toyobo Co., Ltd.) containing metal element in the resin skeleton.

Comparative Example 2

A coating solution (a') for undercoating was obtained in the same manner as in Example 1 but using a solution obtained by adding 1% by mass of sodium dodecylbenzenesulfonate to the solution of a nonaqueous polyester polyol (Vylon 200, Mn=17,000, hydroxyl value=6, Tg=67° C., manufactured by Toyobo Co., Ltd.) without containing metal element and stirring the mixture thereof, instead of using the nonaqueous polyester polyol (Vylon GK570, Mn=17,000, hydroxyl value=7, Tg=0° C., manufactured by Toyobo Co., Ltd.) containing metal element in the resin skeleton.

Comparative Example 3

A coating solution (a') for undercoating was obtained in the same manner as in Example 1 but using calcium carbonate (ACE-35, average primary particle size of 0.7 μm, manufactured by CALFINE CO., LTD.) instead of using calcium carbonate (Brilliant 1500, average primary particle size of 0.15 μm, manufactured by SHIRAISHI CALCIUM KAISHA, LTD.) as the alkaline compound of the polyvalent metal in the coating solution (a') for undercoating.

Comparative Example 4

A coating solution (a') for undercoating was obtained in the same manner as in Example 1 but adjusting the coating material without adding the polyisocyanate (Sumidur N3300, isocyanurate based on 1,6-hexamethylenediisocyanate, manufactured by Sumika Bayer Urethane Co., Ltd.).

Comparative Example 5

A coating solution (a') for undercoating was obtained in the same manner as in Example 1 but using a nonaqueous polyester polyol (Vylon 500, Mn 23,000, hydroxyl value=5, Tg=4° C., manufactured by Toyobo Co., Ltd.) without containing metal element instead of using the nonaqueous polyester polyol (Vylon GK570, Mn=17,000, hydroxyl value=7, Tg=0° C., manufactured by Toyobo Co., Ltd.) containing metal element in the resin skeleton.

Examples 11 to 15

Coating solutions (a') for undercoating were obtained in the same manner as in Example 1 but changing the composition of the isocyanate type curing agent in the coating solution (a') as shown in Table 2.

In Table 2, the Sumidur HT was a straight-chain aliphatic polyisocyanate (adduct type based on 1,6-hexamethylenediisocyanate, solid content of 75% by mass, Tg=−50° C., Mn=950, manufactured by Sumika Bayer Urethane Co.), and the Desmodur Z4470 was an alicyclic polyisocyanate (isocyanurate type based on the isophoronediisocyanate, dissolved in butyl acetate, solid content of 70% by mass, Tg=70° C., Mn=1200, manufactured by Sumika Bayer Urethane Co., Ltd.).

(Preparation of the Polycarboxylic Acid Type Polymer-Containing Solution)

A polycarboxylic acid type polymer-containing solution (b) was obtained by using a polyacrylic acid (AC-10LHP manufactured by Nihon Junyaku Co.) as the polycarboxylic acid type polymer, and dissolving it in a water/acetone mixed solvent (weight ratio of 50/50) so that the solid content was 6% by mass.

(Preparation of Gas-Barrier Laminates)

By using a bar coater, each of the above coating solutions (a') was applied onto a biaxially stretched polyethylene terephthalate film 2 of a thickness of 12 μm, and was thrown into a box-type electric oven set at a temperature of 70° C. for 30 seconds so as to be dried to thereby obtain a polyethylene terephthalate film having an undercoating 3 applied in an amount of 1.6 g/m². Immediately thereafter, the above polycarboxylic acid type polymer-containing solution (b) was applied by using a bar coater onto the above undercoating 3 in an application amount of 1.8 g/m² to form a precursor layer (B). Here, the amount of applying the precursor layer (B) is the amount of application found by applying the solution (b) directly onto the biaxially stretched polyethylene terephthalate film followed by drying, i.e., found by drying only the polyacrylic acid in the solution (b) without forming ionic crosslinking.

Here, under the conventional film-forming conditions, the solution (b) after applied was allowed to set for 10 seconds, was thrown into a conveyer-type electric oven, and was heat-treated at a temperature set at 60° C. for a pass time of 15 seconds, and the gas-barrier laminate was formed having, on the layer 3, a layer 4 forming ionic crosslinking in the precursor layer (B).

Under the film-forming conditions conducted for a short period of time, on the other hand, the solution (b) after applied was readily thrown into the conveyer-type electric oven, and was heat-treated at a temperature set at 60° C. for a pass time of 15 seconds, and the gas-barrier laminate was formed having, on the layer 3, the layer 4 forming ionic crosslinking in the precursor layer (B).

For evaluating the high-speed treatment adaptability (anti-cracking property) that will be described later, further, the solution (b) after applied was readily thrown into the conveyer-type electric oven, and was heat-treated at a temperature set at 100° C. for a pass time of 5 seconds, and a gas-barrier laminate was formed having, on the layer 3, a layer 4 forming ionic crosslinking in the precursor layer (B) to evaluate the state of the coating surface.

(Preparation of Laminates)

Figure 2:
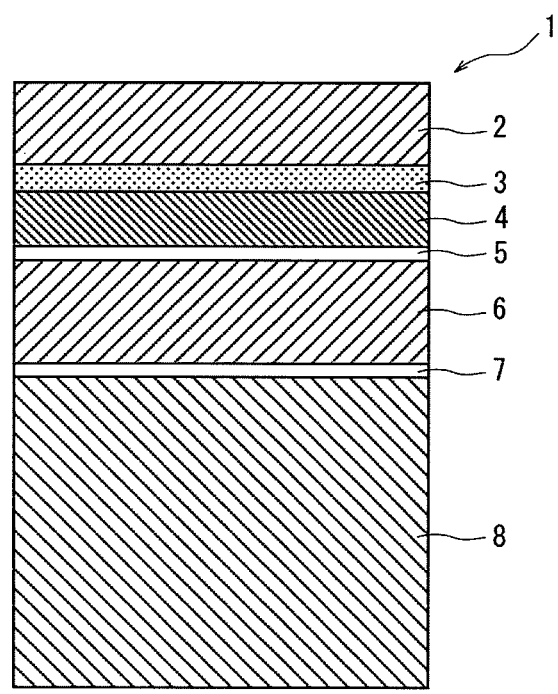
FIG. 2 is a view showing, in cross section, a structure of a laminate formed in Example.

With the coating of the gas-barrier laminate as a lower layer, there were successively laminated a layer 5 of an urethane type adhesive of a thickness of 2 μm, a biaxially stretched nylon film 6 of a thickness of 15 μmm, a layer 7 of an urethane type adhesive of a thickness of 2 μm and an unstretched polypropylene film 8 of a thickness of 70 μm to prepare a laminate 1 of a layer constitution as shown in FIG. 2 for use for various tests.

(Calculating the Ionic Crosslinking Ratio)

The gas-barrier laminate which has been ionically crosslinked was calculated for its ionic crosslinking ratio by taking a measurement by using a Fourier transform infrared spectrophotometer. Due to the formation of ionic crosslinking, the carboxylic acid converts into a carboxylate. Usually, it has been known that the carboxylic acid has characteristic absorption bands at the wavelengths near 920 to 970 $cm^{-1}$, near 1700 to 1710 $cm^{-1}$ and near 2500 to 3200 $cm^{-1}$, and the acid anhydride thereof has a characteristic absorption band at the wavelengths near 1770 to 1800 $cm^{-1}$. Further, it has been known that the carboxylate has a characteristic absorption band at wavelengths near 1480 to 1630 $cm^{-1}$. The ionic crosslinking ratio is calculated by using peak heights of the carboxylic acid and the acid anhydride that have peaks in the wavelength region of 1600 to 1800 $cm^{-1}$ and a peak height of the carboxylate that has a peak in the wavelength region of 1480 to 1630 $cm^{-1}$. More desirably, there are used peak heights that have peaks in the wavelength regions of (i) 1695 to 1715 $cm^{-1}$ and (ii) 1540 to 1610 $cm^{-1}$. The infrared absorption spectra of the samples are detected, and absorbencies are measured at the wavelengths (i) and (ii) to obtain peak heights. The absorbency coefficients of the carboxylic acid and the carboxylate are regarded to be the same, and the salt conversion of the carboxyl group (ratio of conversion from the carboxylic acid into the carboxylate), i.e., the ionic crosslinking ratio X is calculated according to the following formula (1), $$X = \text{peak height of } (ii)/[\text{peak height of } (i) + \text{peak peak height of } (ii)] \quad (1)$$

The peak heights of (i) and (ii) stand for differences in the absorbency between the peaks and the points at where the hems of peaks overlap the base line.

(Measuring Conditions of the Fourier Transform Infrared Spectrophotometer)

Instrument used: FTS 7000 Series, manufactured by Digilab, Inc.

Measuring method: one-time reflection method using a germanium prism.

Measuring wavelength region: 4000 to 700 $cm^{-1}$ (Transparency of Coating)

The transparency of coating was found from the measurement of a transmission haze of the gas-barrier laminate which has been ionically crosslinked by using a turbidimeter (NDH 2000) manufactured by NIPPON DENSHOKU INDUSTRIES CO., LTD. and was evaluated on the following basis.

⊚: Transmission haze was less than 6%.
○: Transmission haze was 6 to less than 8%.
Δ: Transmission haze was 8 to less than 10%.
x: Transmission haze was not less than 10%.

(Oxygen Permeation Amount)

The laminate of the plastic film that was obtained was measured for its oxygen permeation amount by using an oxygen permeation amount measuring device (OX-TRAN 2/20 manufactured by MOCON Inc.). The oxygen permeation amount was also measured after the retort sterilization treatment conducted at 120° C. for 30 minutes. The measuring conditions consisted of an environmental temperature of 25° C. and a relative humidity of 80%.

Favorable ranges of the oxygen permeation amount are not more than 0.5 $cm^3/m^2 \cdot day \cdot atm$ before the retort treatment and not more than 1 $cm^3/m^2 \cdot day \cdot atm$ after the retort treatment.

(Retort Resistance)

The laminate of the plastic film that was obtained was subjected to the retort-sterilization treatment at 120° C. for 30 minutes, and a change in the state of the laminate was observed with the eye and was evaluated on the following basis.

⊚: No change before and after the retort sterilization.
○: Transparency slightly decreased after the retort sterilization but was not conspicuous.
Δ: The interior of the laminate was whitened but was not delaminated.
x: Delamination was seen in interior of the laminate.

(High-Speed Treatment Adaptability (Anti-Cracking Property)

In order to evaluate the adaptability to the high-speed continuous treatment, the gas-barrier laminate was heat-treated in the oven set a temperature of 100° C. and a pass time of 5 seconds, which were higher than and shorter than those of the above film-forming conditions conducted for a short period of time, and the state of the coating surface was evaluated with the eye on the following basis.

⊚: The coating surface was free of abnormal condition and was favorable.
○: The surface luster slightly decreased without, however, any crack.
Δ: Cracks were seen slightly in part of the coating surface.
x: Cracks were seen in the whole coating surface.

(Evaluating the Interlayer Close Adhesion)

The laminate of the plastic film that was obtained was folded and fixed, and was stored in a state of being dipped in water of 20 to 25° C. When taken out from the water, the gas-barrier laminate was checked for the occurrence of peeling at the folded portion. When there were one or more peeling portions after stored for 3 days, the interlayer adhesion was evaluated to be x. When there was no peeling after stored for 3 days but when there were one or more peeling portions after stored for one week, the interlayer adhesion was evaluated to be ○. When there was quite no peeling portion after stored for one week, the interlayer adhesion was evaluated to be ⊚.

Tables 1 and 2 show the contents of Examples and Comparative Examples together with their tested results.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|---|---|
| *UC | | | | | | | | | | | | | | | |
| *1 | | | | | | | | | | | | | | | |
| *1-1 | | | 50 | | | | | | | | | | | | |
| *1-2 | | 50 | | 90 | | 40 | | | | | 100 | 100 | | | |
| *1-3 | | | | | | | | | | | | | | | 100 |
| *1-4 | | | | | | | | | | | | | | 1 | |

TABLE 1-continued

| | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|---|---|
| *2 | | | | | | | | | | | | | | | |
| *2-1 | 100 | 50 | | 10 | 90 | 30 | | 100 | 100 | 100 | | | 100 | 100 | |
| *2-2 | | | 50 | | 10 | 30 | 100 | | | | | | | | |
| *3 | | | | | | | | | | | | | | | |
| *3-1 | 30 (10 eq) | 30 (10.8 eq) | 30 (10.8 eq) | 30 (11.5 eq) | 30 (9.7 eq) | 15.4 (5 eq) | 30 (7.8 eq) | 30 (10 eq) | 30 (10 eq) | | 30 (11.7 eq) | 30 (11.7 eq) | 30 (10 eq) | | 30 (14 eq) |
| *3-2 | | | | | | | | | | 30 (7 eq) | | | | | |
| *4 | | | | | | | | | | | | | | | |
| *4-1 | 250 | 250 | 250 | 250 | 250 | 250 | 250 | 160 | 380 | 250 | 250 | 250 | | 250 | 250 |
| *4-2 | | | | | | | | | | | | | 250 | | |
| *BC | | | | | | | | | | | | | | | |
| *5 | | | | | | | | | | | | | | | |
| *5-1 | 100 | 100 | 100 | 100 | 100 | 100 | 100 | 100 | 100 | 100 | 100 | 100 | 100 | 100 | 100 |
| *Results | | | | | | | | | | | | | | | |
| *6 | | | | | | | | | | | | | | | |
| *① | >90% | 82% | 79% | 71% | >90% | 85% | >90% | >90% | >90% | >90% | 38% | 31% | >90% | >90% | 35% |
| *② | ◎ | ◎ | ◎ | ◎ | ◎ | ◎ | ○ | ◎ | ○ | ○ | ○ | ◎ | X | X | ○ |
| *③ | | | | | | | | | | | | | | | |
| *b | <0.1 | <0.1 | <0.1 | <0.1 | <0.1 | <0.1 | <0.1 | <0.1 | <0.1 | <0.1 | <0.1 | <0.1 | <0.1 | <0.1 | <0.1 |
| *a | <0.1 | <0.1 | <0.1 | <0.1 | <0.1 | <0.1 | <0.1 | <0.1 | <0.1 | <0.1 | <0.1 | <0.1 | <0.1 | *d | <0.1 |
| *④ | ◎ | ◎ | ◎ | ◎ | ◎ | ◎ | ○ | ◎ | ○ | ○ | ○ | ○ | Δ | X | ○ |
| *7 | | | | | | | | | | | | | | | |
| *① | 65% | 56% | 54% | 40% | 64% | 61% | 60% | 45% | 68% | 59% | 19% | 16% | 55% | 55% | 17% |
| *② | ◎ | ◎ | ◎ | ◎ | ◎ | ◎ | ○ | ◎ | ○ | ○ | ○ | ○ | X | X | ○ |
| *③ | | | | | | | | | | | | | | | |
| *b | <0.1 | <0.1 | <0.1 | <0.1 | <0.1 | <0.1 | <0.1 | <0.1 | <0.1 | <0.1 | 0.7 | 3.5 | <0.1 | <0.1 | 1.1 |
| *a | <0.1 | <0.1 | <0.1 | <0.1 | <0.1 | <0.1 | <0.1 | <0.1 | <0.1 | <0.1 | 1.5 | 8.3 | <0.1 | *d | 2.1 |
| *④ | ◎ | ◎ | ◎ | ◎ | ◎ | ◎ | ○ | ◎ | ○ | ○ | ○ | ○ | Δ | X | ○ |
| *8 | | | | | | | | | | | | | | | |
| *8-1 | ○ | ◎ | ◎ | ◎ | ◎ | ◎ | ◎ | ◎ | ○ | ○ | ◎ | ◎ | ○ | ○ | ◎ |

*UC: Undercoat,
*1: Nonaqueous polyester polyol,
*1-1: Vylon 550 (Mn: 28,000, Tg: −15° C., OHV: 4),
*1-2: Vylon 200 (Mn: 17,000, Tg: 67° C., OHV: 6),
*1-3: Vylon 500 (Mn: 23,000, Tg: 4° C., OHV: 5),
*1-4: monovalent metal salt (Na dodecylbenzenesulfonate),
*2: Metal element-containing nonaqueous polyester polyol,
*2-1: Vylon GK570 (Mn: 17,000, Tg: 0° C., OHV: 7),
*2-2: Vylon 240 (Mn: 15,000, Tg: 60° C., OHV: 9),
*3: Polyisocyanate (Amount of the polyisocyanate is expressed as equivalents to the hydroxyl value of each polyester polyol.),
*3-1: Sumidur N3300 (HMDI-nurate Mn: 680, Tg: −60° C.),
*3-2: Sumidur HT (HMDI adduct Mn: 950, Tg: −50° C.),
*4: Calcium carbonate,
*4-1: Brilliant 1500 (Ave. pri. ptcl. size: 0.15 μm),
*4-2: Calfine ACE35 (Ave. pri. ptcl. size: 0.7 μm)
*BC: Barrier coat
*5: Polyacrylic acid
*5-1: AC-10LHP (6%(water/acetone = 50/50) solution)
*Results: Tested results,
*6: (Conventional film-forming conditions): applied → time until oven of 10-12 sec., oven temp. 60° C., 15 sec. of pass.,
*①: Ionic crosslinking ratio,
*②: Coating transparency (haze),
*③: Oxygen permeation amount(cm3/m2 · day · atm),
*b: (before retort),
*a: (after retort),
*④: Retort resistance (with the eye),
*7: (Short-time film-forming conditions): applied → time until oven of 2 sec. or less, oven temp. 60° C., 15 sec. of pass.,
*8: (Evaluation of hi-speed treatment adaptability): applied → time until oven of 2 sec. or less, oven temp. 100° C., 5 sec. of pass.,
*8-1: Hi-speed treatment adaptability (anti-cracking property),
*d: Delamination

TABLE 2

|  | Ex. 11 | Ex. 12 | Ex. 13 | Ex. 14 | Ex. 15 |
|---|---|---|---|---|---|
| Undercoat |  |  |  |  |  |
| Metal element-containing nonaqueous polyester polyol |  |  |  |  |  |
| Vylon GK570 (Mn: 17,000, Tg: 0° C., OHV: 7) | 100 | 100 | 100 | 100 | 100 |
| Polyisocyanate** |  |  |  |  |  |
| Sumidur N3300 (HMDI-nurate Mn: 680, Tg: −60° C.) | 15 (5.0eq) | 5 (1.7eq) | 18 (6.0eq) | 42 (14eq) |  |
| Sumidur HT (HMDI adduct Mn: 950, Tg: −50° C.) |  |  |  |  | 15 (3.5eq) |
| Desmodur Z4470 (IPDI-nurate Mn: 1200, Tg: 70° C.) | 15 (3.4eq) | 25 (5.6eq) | 12 (2.7eq) | 18 (4.0eq) | 15 (3.4eq) |
| Calcium carbonate |  |  |  |  |  |
| Brilliant 1500 (Ave. pri. ptcl. size: 0.15 μm) | 250 | 250 | 250 | 250 | 250 |
| Barrier coat |  |  |  |  |  |
| Polyacrylic acid |  |  |  |  |  |
| AC-10LHP {6%(water/acetone = 50/50) solution} | 100 | 100 | 100 | 100 | 100 |
| Tested results |  |  |  |  |  |
| (Short-time film-forming condition)* |  |  |  |  |  |
| Ionic crosslinking ratio | 62% | 59% | 62% | 64% | 58% |
| Coating transparency (haze) | ⊚ | ⊚ | ⊚ | ⊚ | ○ |
| Oxygen permeation amount (cm³/m² · day · atm) |  |  |  |  |  |
| (before retort) | <0.1 | <0.1 | <0.1 | <0.1 | <0.1 |
| (after retort) | <0.1 | <0.1 | <0.1 | <0.1 | <0.1 |
| Retort resistance (with the eye) | ⊚ | ⊚ | ⊚ | ⊚ | ○ |
| Interlayer adhesion | ⊚ | ⊚ | ⊚ | ○ | ○ |

**Amount of the polyisocyanate is expressed as equivalents to the hydroxyl value of each polyester polyol.
*(Short-time film-forming conditions): applied → time until oven of 2 sec. or less, oven temp. 60° C., 15 sec. of pass.

Examples 1 to 7 exhibited favorable coating surface state and transparency under both the short-time film-forming conditions and the conventional film-forming conditions and, specifically, exhibited high ionic crosslinking ratios and good oxygen-barrier property even under short-time film-forming conditions. Further, Examples 11 to 13 exhibited favorable close interlayer adhesion.

INDUSTRIAL APPLICABILITY

In forming the gas-barrier layer having a crosslinked structure between the polycarboxylic acid type polymer and the polyvalent metal ions, the coating composition of the present invention works to easily and quickly feed the polyvalent metal ions into the polycarboxylic acid type polymer and, besides, into the gas-barrier layer as a whole, achieving a high ionic crosslinking ratio and imparting excellent gas-barrier property to the gas-barrier layer without the need of effecting the dip treatment or the spray treatment.

Use of the coating composition of the invention makes it possible to easily form the crosslinked structure relying only upon the heating at a low temperature for a short period of time without adversely affecting the plastic base material that forms the gas-barrier layer and enabling the production time and the energy to be further decreased. Accordingly, an excellent gas-barrier material (gas-barrier laminate) can be formed maintaining good productivity.

The coating composition of the invention features improved interlayer adhesion to the gas-barrier layer or to the plastic base material on which the coating composition is applied, and can be favorably used for the production of gas-barrier laminates for which flexibility is required.

DESCRIPTION OF REFERENCE NUMERALS

1: laminate
2: biaxially stretched polyethylene terephthalate film of a thickness of 12 μm
3: layer (A) containing an alkaline compound of a polyvalent metal
4: layer forming metal ionic crosslinking among the carboxyl groups of the polycarboxylic acid type polymer in a precursor layer (B)
5, 7: layers of an urethane type adhesive of a thickness of 2 μm
6: biaxially stretched nylon film of a thickness of 15 μm
8: unstretched polypropylene film of a thickness of 70 μm
10: plastic base material
11: undercoating
12: gas-barrier layer

The invention claimed is:
1. A coating composition for undercoating applied as an undercoating onto the surface of a plastic base material for forming a gas-barrier layer that has a crosslinked structure of a polycarboxylic acid polymer and polyvalent metal ions, said coating composition containing, as chief components, a nonaqueous polyester polyol, an isocyanate compound having at least two isocyanate groups in a molecule thereof, and an alkaline compound of a polyvalent metal that serves as an ion source for forming said crosslinked structure, wherein:

said nonaqueous polyester polyol comprises two or more kinds of nonaqueous polyester polyols inclusive of a nonaqueous polyester polyol of a low Tg having a glass transition temperature (Tg) of not lower than −30° C. but lower than 30° C. and a nonaqueous polyester polyol of a high Tg having a glass transition temperature (Tg) of 30 to 90° C.;

said nonaqueous polyester polyol is contained in an amount of 10 to 100% by mass in the resin component of the coating composition, and if the weight of a curing agent necessary for the reaction by the amount of a hydroxyl value of said nonaqueous polyester polyol is presumed to be one equivalent, said isocyanate compound is contained in an amount of 5 to 40 equivalents, and said alkaline compound of the polyvalent metal is contained in an amount of 150 to 400 parts by mass per total of 100 parts by mass of said nonaqueous polyester polyol and the isocyanate compound;

said nonaqueous polyester polyol contains, as an essential component, a nonaqueous polyester polyol which contains a metal element in the resin skeleton thereof; and said alkaline compound of the polyvalent metal comprises at least one of a carbonate of calcium or magnesium or a hydroxide of calcium or magnesium, and has a number average primary particle diameter in a range of 0.005 to 0.5 μm.

2. The coating composition for undercoating according to claim 1, wherein the metal element contained in said resin skeleton is a monovalent metal element.

3. The coating composition for undercoating according to claim 1, wherein said nonaqueous polyester polyol contains, in an amount of at least 10% by mass, a nonaqueous polyester polyol that contains a metal element in the resin skeleton thereof.

4. The coating composition for undercoating according to claim 1, wherein said nonaqueous polyester polyol contains the nonaqueous polyester polyol of the high Tg having the glass transition temperature (Tg) of 30 to 90° C. in an amount of at least 10% by mass.

5. The coating composition for undercoating according to claim 1, wherein said isocyanate compound is a polyfunctional polyisocyanate compound having a number average molecular weight of not less than 200 and not less than 3 isocyanate groups in a molecule thereof.

6. The coating composition for undercoating according to claim 1, wherein said alkaline compound of the polyvalent metal is contained in an amount of 150 to 400 parts by mass per a total of 100 parts by mass of said nonaqueous polyester polyol and the isocyanate compound.

7. The coating composition for undercoating according to claim 1, wherein said isocyanate compound comprises a combination of a straight-chain aliphatic isocyanate compound and an alicyclic isocyanate compound having an alicyclic structure in the skeleton thereof.

8. The coating composition for undercoating according to claim 7, wherein the ratio of said straight-chain aliphatic isocyanate compound and said alicyclic isocyanate compound is 60:40 to 15:85 (weight ratio).

9. The coating composition for undercoating according to claim 7, wherein said straight-chain aliphatic isocyanate compound has an isocyanurate structure.

10. The coating composition for undercoating according to claim 7, wherein said straight-chain aliphatic isocyanate compound has a glass transition temperature (Tg) of not higher than −20° C. and a number average molecular weight (Mn) of not more than 1200, and said alicyclic isocyanate compound has a glass transition temperature (Tg) of not lower than 50° C. and a number average molecular weight (Mn) of not less than 400.

* * * * *